US008291178B2

(12) United States Patent
Tsai et al.

(10) Patent No.: US 8,291,178 B2
(45) Date of Patent: Oct. 16, 2012

(54) MACHINE-IMPLEMENTED METHOD FOR CATEGORIZING STORAGE MEDIA, AND MACHINE-IMPLEMENTED METHOD FOR STORING TARGET CODES

(75) Inventors: Meng-Hung Tsai, Taipei Hsien (TW); Yu-Hsuan Lee, Taipei Hsien (TW)

(73) Assignee: Apacer Technology Inc., Taipei Hsien (TW)

( * ) Notice: Subject to any disclaimer, the term of this patent is extended or adjusted under 35 U.S.C. 154(b) by 301 days.

(21) Appl. No.: 12/631,953

(22) Filed: Dec. 7, 2009

(65) Prior Publication Data

US 2010/0146227 A1    Jun. 10, 2010

(30) Foreign Application Priority Data

Dec. 8, 2008   (TW) ............................. 97147637 A
Jan. 23, 2009  (TW) ............................. 98102866 A

(51) Int. Cl.
    G06F 12/00    (2006.01)
(52) U.S. Cl. ...................................... 711/156; 711/170
(58) Field of Classification Search .................. 711/156, 711/170
    See application file for complete search history.

(56) References Cited

U.S. PATENT DOCUMENTS

| 5,890,205 | A  | * | 3/1999  | Grimsrud et al. ............. 711/112 |
| 5,920,896 | A  | * | 7/1999  | Grimsrud et al. ............. 711/165 |
| 7,949,847 | B2 | * | 5/2011  | Murase ......................... 711/170 |
| 8,001,352 | B1 | * | 8/2011  | Chatterjee et al. ............ 711/165 |
| 2008/0027905 | A1 | * | 1/2008  | Jensen et al. ..................... 707/2 |
| 2008/0112238 | A1 | * | 5/2008  | Kim et al. ..................... 365/200 |
| 2008/0276061 | A1 | * | 11/2008 | Takaoka et al. .............. 711/170 |

FOREIGN PATENT DOCUMENTS

CN          1534490 A       10/2004

* cited by examiner

*Primary Examiner* — Hashem Farrokh
(74) *Attorney, Agent, or Firm* — Hunton & Williams LLP

(57) ABSTRACT

A machine-implemented method, which is for categorizing a plurality of to-be-categorized storage units of a storage medium, includes: a) using a processor to write categorizing data for filling each of the to-be-categorized storage units of the storage medium; b) using a processor to determine a data access time of each of at least some of the to-be-categorized storage units by reading the categorizing data therein and to record the data access times of said at least some of the to-be-categorized storage units; and c) using a processor to categorize the to-be-categorized storage units into a plurality of groups that respectively correspond to a plurality of data access speed categories with reference to the recorded data access times.

20 Claims, 4 Drawing Sheets

MACHINE-IMPLEMENTED METHOD FOR CATEGORIZING STORAGE MEDIA, AND MACHINE-IMPLEMENTED METHOD FOR STORING TARGET CODES

CROSS-REFERENCE TO RELATED APPLICATION

This application claims priorities of Taiwanese Application Nos. 097147637 and 098102866, filed respectively on Dec. 8, 2008 and Jan. 23, 2009.

BACKGROUND OF THE INVENTION

1. Field of the Invention

The invention relates to a method for storing software, more particularly to a machine-implemented method for categorizing a storage medium and for storing a target code into a storage medium.

2. Description of the Related Art

In the modern world, computers play a significant role in people's daily lives for both work and entertainment. Non-volatile memory, such as a hard drive, or a flash memory that provides high access speed and consumes low power, is normally used in the computer for installation of the operating system or storage of important data.

A hard drive is generally composed of at least one disk (or platter), at least one read-write head, and a spindle motor. A platter can be divided into multiple concentric tracks. Each track can be further divided into a plurality of equally sized sectors. When it is desired to read data from the hard drive, the read-write head first moves to the track corresponding to the desired data, and then the spindle motor rotates the platter to move the sector corresponding to the desired data under the read-write head so that the desired data can be read by the read-write head. The time it takes for the read-write head to move to the corresponding track is called "seek time", and the time it takes for the spindle motor to move the corresponding sector under the read-write head is called "rotation time".

A "disk access time" refers to the combination of the seek time, the rotation time, and a "data transfer time", which is the time it takes for the read-write head to read/write a sector. However, for current hard drives, different sectors of a disk have different data access times. Therefore, when poorly managed, it would be very time consuming to access important files and software. For instance, a lot of people have experienced a long and tedious waiting period before the Windows® operating system can be fully turned on. Therefore, it is necessary to find a sector (or sectors) with faster data access time(s) for installation of important files and software, such as the Windows® operating system, in order to effectively speed up specific operations of the computer.

SUMMARY OF THE INVENTION

Therefore, an object of the present invention is to provide a method for categorizing a plurality of storage units of a storage medium.

According to one aspect of the present invention, there is provided a machine-implemented method for categorizing a plurality of to-be-categorized storage units of a storage medium. The machine-implemented method includes the steps of: a) using a processor to write categorizing data for filling each of the to-be-categorized storage units of the storage medium; b) using a processor to determine a data access time of each of at least some of the to-be-categorized storage units by reading the categorizing data therein and to record the data access times of said at least some of the to-be-categorized storage units; and c) using a processor to categorize the to-be-categorized storage units into a plurality of groups that respectively correspond to a plurality of data access speed categories with reference to the data access times recorded in step b).

Another object of the present invention is to provide a method for storing a target code in a storage medium in order to increase operating efficiency of a computing device that is connected to the storage medium.

According to another aspect of the present invention, there is provided a machine-implemented method for storing a target code in a storage medium that includes a plurality of storage units. The machine-implemented method includes the steps of: a) using a processor to categorize the storage units of the storage medium into a plurality of groups; b) using a processor to make each of the storage units in a first one of the groups available for data writing, and to make each of the storage units in the other ones of the groups unavailable for data writing; and c) using a processor to write at least a portion of the target code into the storage units in the first one of the groups.

According to still another aspect of the present invention, there is provided a machine-implemented method for storing a target code in a storage medium that includes a plurality of storage units. The storage units are categorized into a plurality of groups that respectively correspond to a plurality of data access speed categories with reference to data access speeds of the storage units. The machine-implemented method includes the steps of: a) upon receipt of a request to store a target code with a predetermined usage rate, using a processor to select, from among the groups, a selected one of the groups, the data access speed category corresponding to which corresponds to the usage rate of the target code; and b) using a processor to store the target code into at least one of the storage units in the selected one of the groups.

According to yet another aspect of the present invention, there is provided a machine-implemented method for storing a target code in a storage medium that includes a plurality of storage units. The machine-implemented method includes the steps of: a) upon receipt of a request to store a target code with a predetermined usage rate and a predefined capacity, using a processor to find a group of the storage units of the storage medium corresponding to a data access speed category that corresponds to the usage rate of the target code with reference to a data access speed of each of the storage units of the storage medium and the predefined capacity; and b) using a processor to store the target code into at least one of the storage units in the group.

According to further aspects of the present invention, there are provided computer program products, each comprising a data storage medium that includes program instructions to be executed by a computing device so as to enable the computing device to execute steps of a corresponding one of the above said methods.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
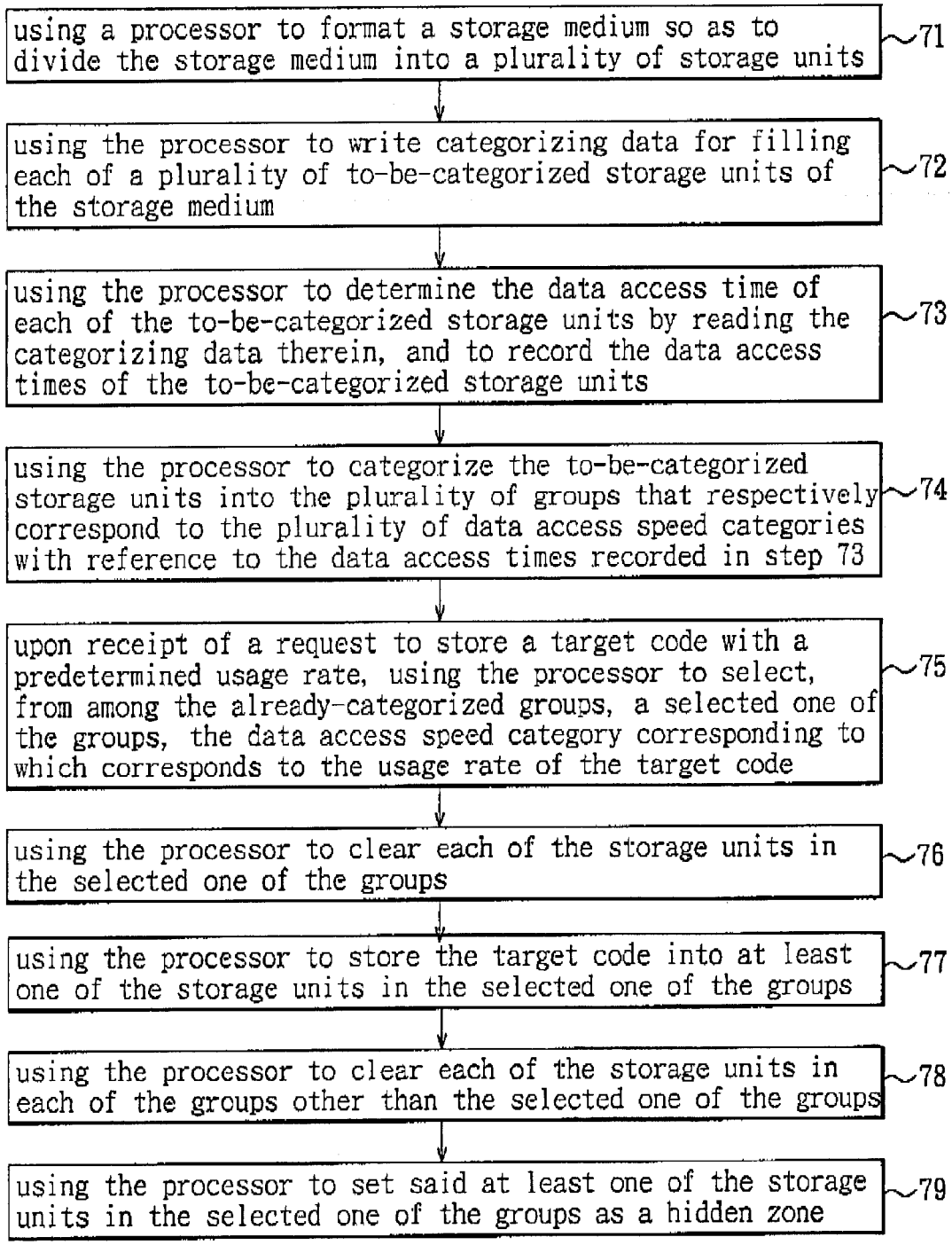
FIG. 1 is a flowchart of a machine-implemented method for storing a target code in a storage medium that includes a plurality of storage units according to the first preferred embodiment of the present invention.

Before the present invention is described in greater detail with reference to the accompanying preferred embodiments, it should be noted herein that like elements are denoted by the same reference numerals throughout the disclosure.

Figure 2:
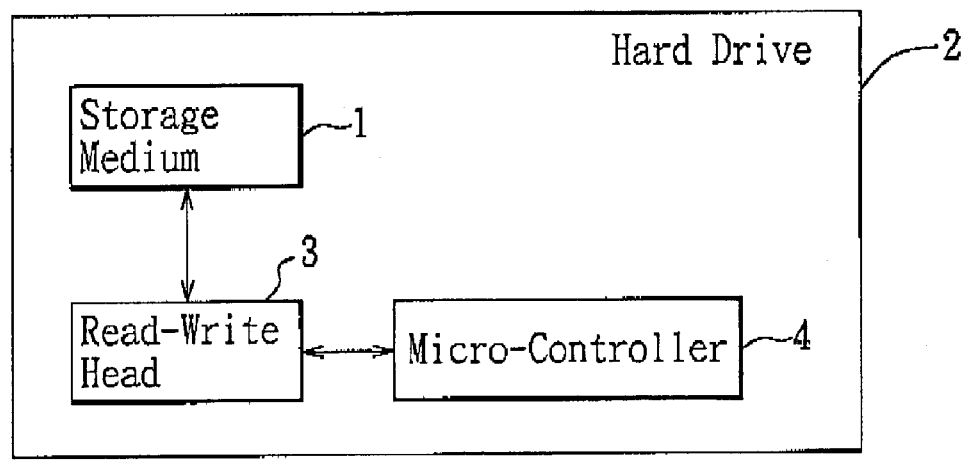
FIG. 2 is a schematic block diagram of a hard drive including a storage medium of the first preferred embodiment.
Figure 3:
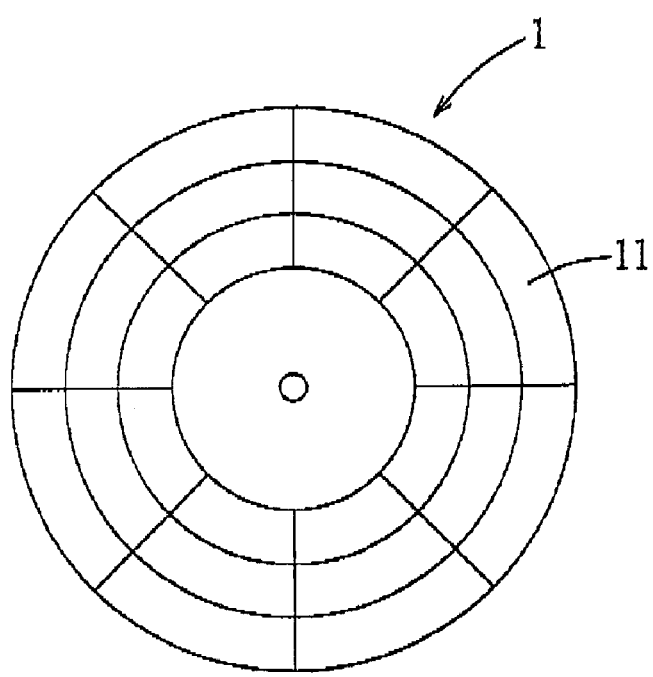
FIG. 3 is a schematic diagram for illustrating a plurality of storage units of the storage medium.

With reference to FIG. 1, FIG. 2 and FIG. 3, a machine-implemented method for storing a target code in a storage medium 1 that includes a plurality of storage units 11 according to the first preferred embodiment of the present invention is shown. The storage medium 1 of this embodiment is part of a hard drive 2 that includes, in addition to the storage medium 1, a read-write head 3 and a micro-controller 4. In particular, the storage medium 1 is a disk (or platter) of the hard drive 2. The disk can be divided into multiple concentric tracks. Each track can be further divided into a plurality of equally sized sectors, which are normally 512 bytes in capacity, and which are referred to hereinafter as the storage units 11. When it is desired to read data stored in a target one of the storage units 11, the read-write head 3 is first controlled by the micro-controller 4 to move to the target storage unit 11, and is then enabled to read data from the target storage unit 11.

It should be noted herein that the storage medium 1 may also be a flash memory in a solid-state drive (SSD) (not shown) in other embodiments of the present invention. A solid-state drive includes a plurality of flash memories. Currently, flash memories can be categorized into three main types, namely, the single level cell (SLC) type, the multiple level cell (MLC) type, and the multi-bit cell (MBC) type. A solid-state drive may include flash memory chips of a single type, or of various types. For example, a hybrid solid-state drive may include a combination of SLC- and MLC-type flash memories. In the case where the storage medium 1 refers to a solid-state drive, the storage unit 11 would refer to a cell in a flash memory in the solid-state drive. For an SLC-type flash memory chip, a cell can store one bit of data, and for a MLC type flash memory chip, a cell can store two to three bits of data. Therefore, when the storage medium 1 is different, the storage capacity of each corresponding storage unit 11 may be different as well. Accordingly, the present invention is not limited to any particular type of storage medium 1 or storage unit 11.

After the method of this embodiment is conducted, the resultant storage medium 1 differs from ordinary platters of a hard drive in that the storage units 11 of the storage medium of this embodiment are categorized into a plurality of groups that respectively correspond to a plurality of data access speed categories with reference to the data access speeds of the storage units 11. Through this categorization of the storage units 11, when the contents of a particular software are stored in the storage units 11 that belong to a group corresponding to a fast data access speed category, it would take less time to load the software.

Now, how the storage units 11 are categorized, and how a target code is stored in the storage medium 1 will be described in the following. It should be noted herein that, for simplicity of illustration, the storage units 11 are only categorized into two different groups, including a group corresponding to fast data access speed (hereinafter referred to as "the fast group"), and a group corresponding to slow data access speed (hereinafter referred to as "the slow group"). In addition, in some embodiments of the present invention, all of the storage units 11 in the storage medium 1 are categorized. However, in other embodiments of the present invention, only some of the storage units 11 in the storage medium 1 are categorized, e.g., the storage units 11 in one of multiple partitions (e.g., C:\ partition or D:\ partition) of the storage medium 1. Moreover, the target code may be part of any operating systems, any software programs, or any files. In the following description, it is assumed that the target code is the Windows® operating system.

With reference to FIG. 1, the machine-implemented method for storing a target code in a storage medium that includes a plurality of storage units according to the first preferred embodiment of the present invention can be divided into two phases, namely a phase for categorizing a plurality of to-be-categorized storage units 11 of the storage medium 1 (hereinafter referred to as the "categorizing phase"), and a phase for actually storing the target code into the storage medium 1 (hereinafter referred to as the "storing phase").

Since the storage medium 1 is a disk of a hard drive 2 in this embodiment, it is necessary to perform step 71 first, where a processor (not shown) is used to format the storage medium 1 so as to divide the storage medium 1 into the plurality of storage units 11 (i.e., sectors of a disk). At this point, each of the storage units 11 is empty. In this embodiment, each of the storage units 11 has a storage capacity of 512 bytes.

It should be noted herein that, in this embodiment, after step 71, and prior to performing step 72, the first several of the storage units 11 (e.g., the first to the sixty-third ones) are reserved for storing backup or recovery files, are set as a hidden zone, and will not be available for categorization into the fast group and the slow group or for storage of the target code For simplicity of illustration, it is assumed that all the other ones of the storage units 11 in the storage medium 1 are subject to categorization (i.e. , all of the storage units 11 are to-be-categorized storage units 11), and that they are referred to interchangeably as the to-be-categorized storage units 11 and the storage units 11.

Within the same storage medium 1, the time it takes for reading/writing individual storage units 11 may be different. Therefore, in order to determine a data access time for each of the to-be-categorized storage units 11, the to-be-categorized storage units 11 are first filled with data, and then the data are read from each of the to-be-categorized storage units 11 for determining the data access time thereof. In particular, in step 72, the processor is used to write categorizing data for filling each of the to-be-categorized storage units 11 of the storage medium 1. Subsequently, in step 73, the processor is used to determine the data access time of each of the to-be-categorized storage units 11 by reading the categorizing data therein, and to record the data access times of the to-be-categorized storage units 11.

It should be noted herein that the categorizing data may include a plurality of identical data units whose length is equal to the storage capacity of a single storage unit 11, so that each of the to-be-categorized storage units 11 is filled with a data unit. Alternatively, the length of each data unit may correspond to the size of the smallest file unit in the target code (e.g., 2 k~4 kbytes for the Windows® operating system).

Therefore, the step of writing the categorizing data to fill the to-be-categorized storage units 11 involves repeatedly writing the data units until all of the to-be-categorized storage units 11 are unavailable for data writing. However, the present invention is not limited in this aspect. In other words, the categorizing data may also include a plurality of differently sized data units.

It should be further noted herein that the step of filling the to-be-categorized storage units 11 with the categorizing data does not necessarily mean that every one of the to-be-categorized storage units 11 is completely occupied with data, and only means that sufficient data is written therein for "rough" estimations of the data access times of the to-be-categorized storage units 11 during the step of reading the categorizing data therein. In addition, it is also not necessary, in practice, to actually determine the data access time of every single one of the to-be-categorized storage units 11 since it is often the case that closely adjacent storage units 11 have similar data access times. Therefore, in some embodiments of the present invention, only the data access times of some of the storage units 11 (e.g., every other couple ones of the storage units 11) are determined in step 73, such that an approximate categorization can be conducted in step 74.

Next, in step 74, the processor is used to categorize the to-be-categorized storage units 11 into the plurality of groups (i.e., the fast group and the slow group in this embodiment) that respectively correspond to the plurality of data access speed categories with reference to the data access times recorded in step 73. An exemplary way of how categorization is implemented is to tag each of the to-be-categorized storage units 11 with a label that indicates one of the fast group and the slow group.

Figure 4:
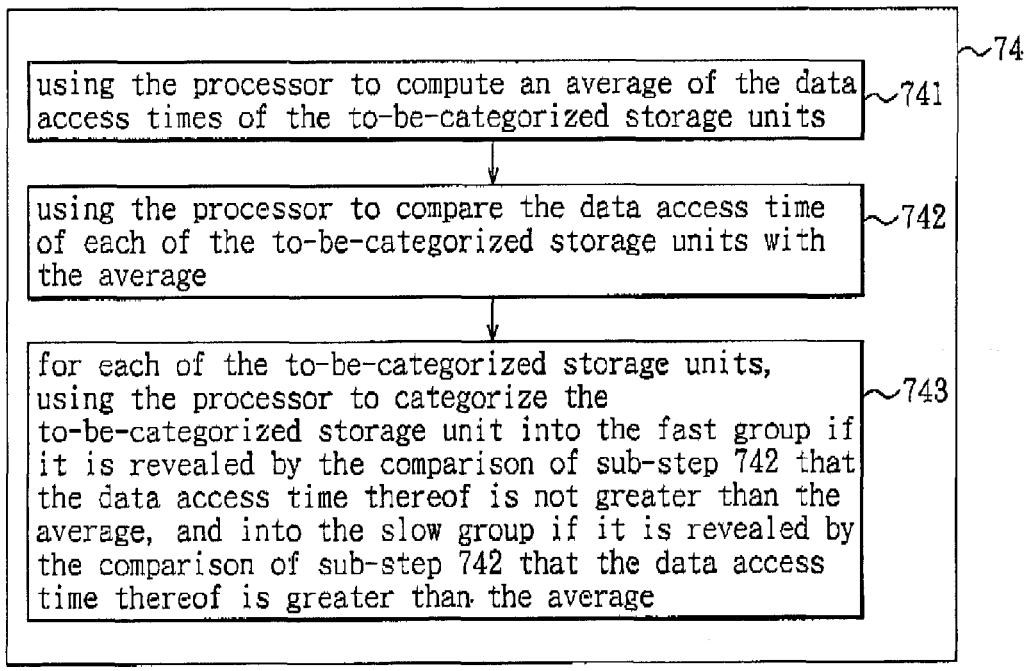
FIG. 4 is a flowchart of step 74 according to a first implementation of the first preferred embodiment.

With reference to FIG. 4, according to one implementation of the first preferred embodiment, step 74 includes the following sub-steps. In sub-step 741, the processor is used to compute an average of the data access times of the to-be-categorized storage units 11. Subsequently, in sub-step 742, the processor is used to compare the data access time of each of the to-be-categorized storage units 11 with the average. Next, in sub-step 743, for each of the to-be-categorized storage units 11, the processor is used to categorize the to-be-categorized storage unit 11 into the fast group if it is revealed by the comparison of sub-step 742 that the data access time thereof is not greater than the average, and into the slow group if it is revealed by the comparison of sub-step 742 that the data access time thereof is greater than the average.

Figure 5:
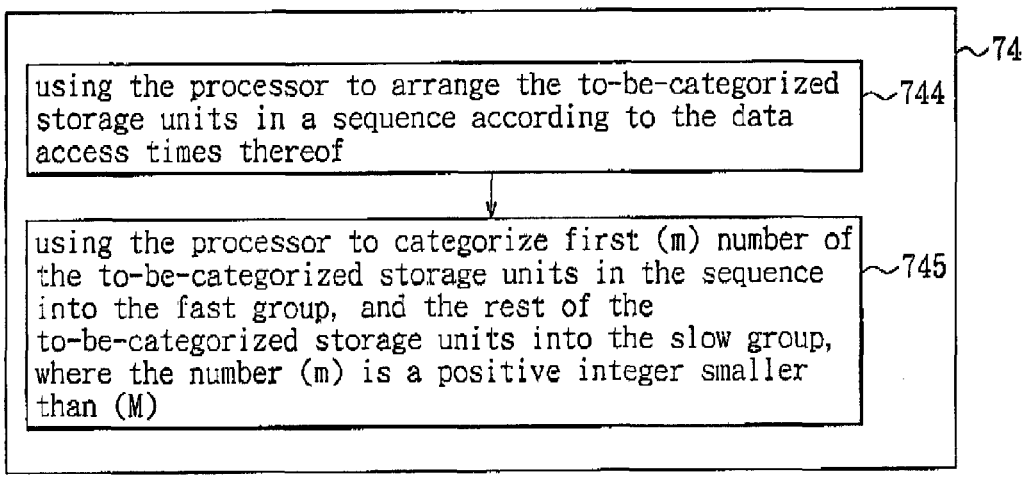
FIG. 5 is a flowchart of step 74 according to a second implementation of the first preferred embodiment.

Alternatively, with reference to FIG. 5 and assuming that the storage medium 1 includes (M) number of the to-be-categorized storage units 11, according to another implementation of the first preferred embodiment, step 74 includes the following sub-steps. First, in sub-step 744, the processor is used to arrange the to-be-categorized storage units 11 in a sequence according to the data access times thereof. Subsequently, in sub-step 745, the processor is used to categorize first (m) number of the to-be-categorized storage units 11 in the sequence into the fast group, and the rest of the to-be-categorized storage units 11 into the slow group, where the number (m) is a positive integer smaller than (M). In this embodiment, the number (m) is not smaller than the smallest integer that is greater than or equal to a predetermined capacity divided by a storage capacity of each of the to-be-categorized storage units 11. In particular, when the method of the present invention is carried out in a factory, where certain program files (e.g., the Windows® operating system) are to be installed in the storage medium 1 prior to offering the storage medium 1 for sale in the consumer market, the sizes of these program files would be known in advance. Therefore, the total storage capacity of the fast group may be designed to accommodate these program files by assigning the number (m) to be not smaller than the smallest integer that is greater than or equal to the known capacity divided by the storage capacity of a single to-be-categorized storage unit 11. For instance, if the known capacity is 2 G bytes, and the storage capacity of a single to-be-categorized storage unit 11 is 512 bytes, then the number (m) may be $4 \times 10^6$.

However, since there are many ways for performing step 74, the present invention is not limited to the specific categorization manners herein disclosed. It should also be noted herein that, since the storage units 11 with shorter data access times (i.e., faster data access speeds) are categorized into the fast group, and the storage units 11 with longer data access times (i.e., slower data access speeds) are categorized into the slow group, reading data from the storage units 11 in the fast group will be faster than reading data from the storage units 11 in the slow group. This difference is especially significant when the storage medium 1 is a hybrid solid-state drive (or a combo flash memory device) including both the SLC- and MLC-type flash memories.

The previously discussed steps 71 to 74 belong to the categorizing phase. Now, the steps of the storing phase will be described.

With reference to FIG. 1, in step 75, upon receipt of a request to store a target code with a predetermined usage rate, the processor is used to select, from among the already-categorized groups, a selected one of the groups, the data access speed category corresponding to which corresponds to the usage rate of the target code.

Here, the predetermined usage rate refers to a predicted usage rate or an actual usage rate. If the target code is predicted to be used more often, the processor would select a group that corresponds to a faster data access speed category. In this embodiment, because the target code is for the Windows® operating system, whose usage rate is essentially the greatest as compared to other programs and files already stored or to be stored in the storage medium 1, the selected group would correspond to the fastest data access speed category, which is the fast group in this embodiment. Consequently, the time it takes for reading (or loading) the Windows® operating system is reduced.

At this stage, due to writing of the categorizing data in step 72, all of the storage units 11 are full and not available for further storage. The next step, i.e., step 76, is to use the processor to clear each of the storage units 11 in the selected one of the groups (i.e., the fast group in this embodiment), i.e., to erase the categorizing data from each of the storage units 11 in the fast group. Subsequently, in step 77, the processor is used to store the target code into at least one of the storage units 11 in the selected one of the groups, i.e., the fast group in this embodiment.

It should be noted herein that, since only the storage units 11 of the fast group, and not the storage units 11 of the slow group, are cleared in the step 76, the storage units 11 of the fast group are the only storage units 11 available for data writing, and thus the Windows® operating system is "forced" to be written into the storage units 11 of the fast group in step 77.

Finally, in step 78, the processor is used to clear each of the storage units 11 in each of the groups other than the selected one of the groups so that these storage units 11 become available for data writing in the future.

It should be noted herein that, there might be cases where the target code requires a storage capacity that is greater than the total capacity of the selected one of the groups. In this case, a portion of the target code is written into the storage units 11 in the selected one of the groups, and the remaining portion of the target code will be written into the storage units 11 in the other groups after the storage units 11 in the other groups are cleared and made available for data writing in step 78. Alternatively, after step 78, since the remaining storage units 11 are still categorized into different groups (assuming that there are more than two groups), the processor may be used to select another group, among the remaining groups, with a data access speed category that corresponds to the usage rate of the target code, and then to purposely make each of the storage units in the newly selected group available for data writing, and to fill each of the storage units 11 in the non-selected group(s) such that each of the storage units 11 in the non-selected group(s) is not available for data writing in order to force the remaining portion of the target code to be written into the storage units 11 in the newly selected group subsequently.

Therefore, through the steps 75 to 78, the target code can be stored in the storage units 11 within a desirable relative data access speed range instead of being stored in the storage units 11 at random. Optionally, the method may further include a step 79, where the processor is used to set said at least one of the storage units 11 in the selected one of the groups (i.e., the storage units 11 into which the target code is written) as a hidden zone after step 78 so as to prevent alteration of the target code. It should be noted herein that this step is optional depending on the characteristics of the target code and/or user requirements. Therefore, the present invention is not limited in this aspect.

It should be further noted herein that, if the target code is for a recovery operating system (including, but not limited to a booting program, an operating system loading program, etc.) that is only used when the actually installed operating system is inoperable, or when re-installation of the operating system is required, since the usage rate of such target code would essentially be the least frequent as compared to other programs and files already stored or to be stored in the storage medium 1, the group selected in step 75 would be the group corresponding to the slowest data access speed category, or at least a relatively slow one of the data access speed categories. In practice, when the group corresponding to the slowest data access speed category is selected for the target code that is directed to the recovery operating system, a number of the storage units 11 in the group having a total capacity at least equal to the size of the target code will be made into a separate partition, and later set as a hidden partition in order to prevent undesirable modification of the target code.

Assuming that the storage medium 1 has the code for the Windows® operating system stored in at least some of the storage units 11 in the fast group, and the code for the recovery Windows® operating system stored in at least some of the storage units 11 in the slow group, a computing device (not shown) coupled to the storage medium 1 is able to load the Windows® operating system relatively faster so as to comparatively shorten the wait period as compared to the prior art, and when the Windows® operating system is damaged or cannot be loaded, the computing device can be enabled to boot or reload the Windows® operating system and recover the code for the Windows® operating system stored in the storage units 11 in the fast group under a BIOS (basic input/output system) mode via the simple use of a hot key. It should be noted herein that a separate booting disc is no longer necessary for recovery or rebooting of the Windows® operating system since the code for the recovery Windows® operating system is already stored in the storage units 11 in the slow group of the storage medium 1.

Moreover, it should also be noted herein that into which group the target code is to be stored can be determined according to the usage rate or other characteristics of the target code, or can be set by a user via a user interface.

The present invention also provides a computer program product, including a data storage medium that includes program instructions to be executed by a computing device so as to enable the computing device to execute the steps of the above described methods. Moreover, although the storage units 11 of the storage medium 1 are categorized into two groups in this embodiment, there may be more than two groups to correspond to more than two data access speed categories in practice so as to provide more options for selection according to the usage rates of various program files/software/target codes.

Generally speaking, the present invention provides that the storage units 11 of the storage medium 1 are categorized into different groups that respectively correspond to different data access speed categories, and that the storage units 11 in one of the groups selected according to the usage rate of a target code are made available for data writing, while the storage units 11 in the other groups are filled so as to be not available for data writing in order to force the target code to be stored into the storage units 11 in the selected group.

For an ordinary disk, the storage units 11 categorized into a particular group are often distributed within a distinct cluster on the disk. Therefore, when the method of the present invention is to be conducted in the factory, after a first one of a plurality of storage mediums 1 with the same standard/specification has its storage units 11 categorized and is installed with the target code (e.g., Windows® operating system), an image file of this first storage medium 1 may be obtained and used for preloading the categorization of the storage units 11 and the installation of the target code into the other storage mediums 1 with the same standard/specification during mass production in the factory. In such a manner, the foregoing process of categorizing the storage units 11 of the storage mediums 1 with the same standard/specification only needs to be conducted once before mass production to thereby significantly save time during fabrication. Furthermore, if the storage medium 1 has two partitions (e.g., C:\ partition and D:\ partition), and only the storage units 11 of one of the partitions (e.g., the C:\ partition) are categorized, then the image file of said one of the partitions (i.e., the C:\ partition) may be stored in the other one of the partitions (i.e., the D:\ partition) for use during system recovery on said one of the partitions (i.e., the C:\ partition) as required.

Figure 6:
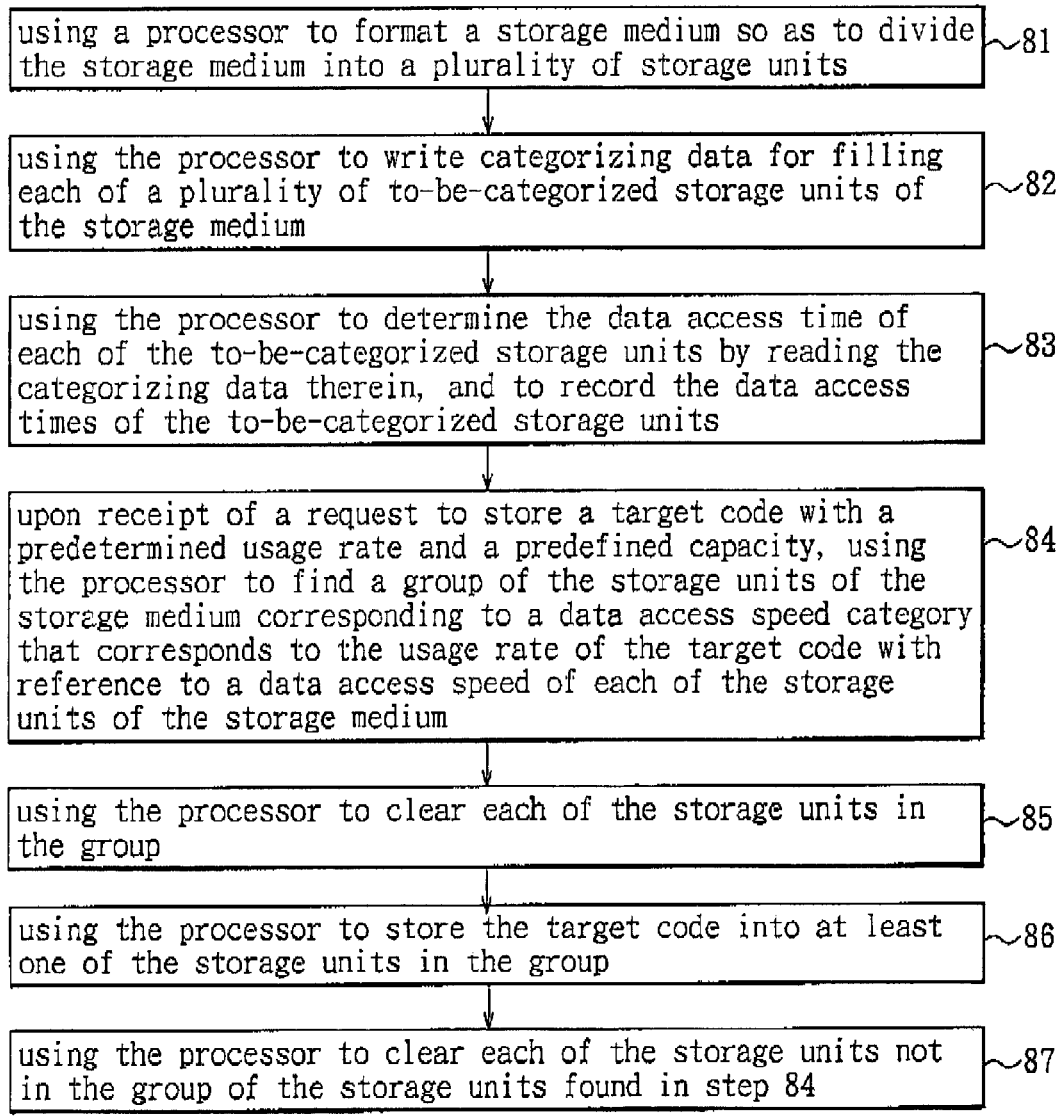
FIG. 6 is a flowchart of a machine-implemented method for storing a target code in a storage medium that includes a plurality of storage units according to the second preferred embodiment of the present invention.

With reference to FIG. 6, the machine-implemented method for storing a target code in a storage medium according to the second preferred embodiment of the present invention mainly differs from the first preferred embodiment in that the storage units 11 of the storage medium 1 are only categorized after receiving a request to store a target code and after knowing a predetermined usage rate and a predefined capacity of the target code according to the second preferred embodiment, whereas in the first preferred embodiment, the storage units 11 are categorized into various groups prior to receipt of the request to store the target code, and then at least one of the groups is selected for storage of the target code according to the predetermined usage rate of the target code.

Since steps 81~83 of the second preferred embodiment are identical to steps 71~73 of the first preferred embodiment, where the storage medium 1 is formatted (in the case where the storage medium 1 is a disk of a hard drive), and the data access time of each of the to-be-categorized storage units 11 is determined and recorded, further details of the same are omitted herein for the sake of brevity.

Subsequently, in step 84, upon receipt of a request to store a target code with a predetermined usage rate and a predefined capacity, the processor is used to find a group of the storage units 11 of the storage medium 1 corresponding to a data access speed category that corresponds to the usage rate of the target code with reference to a data access speed of each of the storage units 11 of the storage medium 1 (i.e., with reference to the data access time of each of the storage units 11) and the predefined capacity. Therefore, after several requests to store several target codes, there would be groups of the storage units 11 in the storage medium 1 that correspond in number to the requests. In this embodiment, since the target code is the Windows® operating system, the group of storage units 11 found in step 84 has the fastest data access speed relative to the other storage units 11 of the storage medium 1.

In other words, the first preferred embodiment involves pre-categorization of the to-be-categorized storage units 11 and "selection" of a suitable group for storage of the target code, while the second preferred embodiment involves a more "customized" way of finding a group of storage units 11 and categorizing them into a group for storage of the target code.

Next, in step 85, the processor is used to clear each of the storage units 11 in the group. Subsequently, in step 86, the processor is used to store the target code into at least one of the storage units 11 in the group, Finally, in step 87, the processor is used to clear each of the storage units 11 not in the group of the storage units 11 found in step 84. Optionally, the processor can be used to set the storage units 11 in the group found in step 84 as a hidden zone after step 87.

It should be noted herein that the term "the processor" used throughout this disclosure may represent "the same processor" or "different processors". In other words, the steps of the machine-implemented methods according to the present invention may be conducted by the same processor or by different processors.

To sum up, the method for storing a target code in a storage medium 1 according to this invention refers to the data access speeds of the storage units 11 in the storage medium 1 and the characteristic (i.e., usage rate) of the target code when selecting a suitable pre-categorized group of storage units 11 corresponding to a data access speed category that corresponds to the usage rate of the target code, or when finding a group of storage units 11 corresponding to a data access speed category that corresponds to the usage rate of the target code, so as to ensure that the time it takes to access each individual code has a matching relationship to the usage rate of the code to thereby enhance operation of the storage medium 1, and to also increase operating efficiency of a computing device that is connected to the storage medium 1. In other words, the present invention provides a method for managing the storage medium 1 such that opening often-used files and loading often-used software are effectively sped up.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A machine-implemented method for categorizing a plurality of to-be-categorized storage units of a storage medium, the machine-implemented method comprising the steps of:
    a) using at least one processor to write categorizing data for filling each of the to-be -categorized storage units of the storage medium;
    b) using the at least one processor to determine a data access time of each of at least some of the to-be-categorized storage units by reading the categorizing data therein and to record the data access times of said at least some of the to-be-categorized storage units; and
    c) using the at least one processor to categorize the to-be-categorized storage units into a plurality of groups that respectively correspond to a plurality of data access speed categories with reference to the data access times recorded in step b), the groups including a group corresponding to fast data access speed, and a group corresponding to slow data access speed;
    wherein step c) includes the sub-steps of:
    c-1) using the at least one processor to compute an average of the data access times of the to-be-categorized storage units;
    c-2) using the at least one processor to compare the data access time of each of the to-be-categorized storage units with the average; and
    c-3) for each of the to-be-categorized storage units, using the at least one processor to categorize the to-be-categorized storage unit into the group corresponding to fast data access speed if it is revealed by the comparison of sub-step c-2) that the data access time thereof is not greater than the average, and into the group corresponding to slow data access speed if it is revealed by the comparison of sub-step c-2) that the data access time thereof is greater than the average.

2. The machine-implemented method as claimed in claim 1, wherein, in step b), the at least one processor is used to determine the data access time of each of the to-be-categorized storage units, and to record the data access times of the to-be-categorized storage units.

3. The machine-implemented method as claimed in claim 2, wherein the groups include a group corresponding to fast data access speed, and a group corresponding to slow data access speed.

4. The machine-implemented method as claimed in claim 3, wherein step e) includes the sub-steps of:
    e-1) using the at least one processor to compute an average of the data access times of the storage units;
    e-2) using the at least one processor to compare the data access time of each of the storage units with the average; and
    e-3) for each of the storage units, using the at least one processor to categorize the storage unit into the group corresponding to fast data access speed if it is revealed by the comparison of sub-step e-2) that the data access time thereof is not greater than the average, and into the group corresponding to slow data access speed if it is revealed by the comparison of sub-step e-2) that the data access time thereof is greater than the average.

5. The machine-implemented method as claimed in claim 3, the storage medium including (M) number of the storage units, wherein step e) includes the sub-steps of:
    e-1) using the at least one processor to arrange the storage units in a sequence according to the data access times thereof; and
    e-2) using the at least one processor to categorize first (m) number of the storage units in the sequence into the group corresponding to fast data access speed, and the rest of the storage units into the group corresponding to slow data access speed, (m) being a positive integer smaller than (M).

6. The machine-implemented method as claimed in claim 5, wherein (m) is not smaller than the smallest integer that is greater than or equal to a predetermined capacity divided by a storage capacity of each of the storage units.

7. The machine-implemented method as claimed in claim 2, further comprising the step of, after step b): f) using the at least one processor to clear each of the storage units in each of the groups other than the selected one of the groups.

8. The machine-implemented method as claimed in claim 1, wherein, in step b), the at least one processor is used to determine the data access time of every other couple ones of the to-be-categorized storage units, and to record the data access times of said every other couple ones of the to-be-categorized storage units.

9. The machine-implemented method as claimed in claim 1, wherein (m) is not smaller than the smallest integer that is greater than or equal to a predetermined capacity divided by a storage capacity of each of the to-be-categorized storage units.

10. A machine-implemented method for categorizing a plurality of to-be-categorized storage units of a storage medium, the machine-implemented method comprising the steps of:
 a) using at least one processor to write categorizing data for filling each of the to-be-categorized storage units of the storage medium;
 b) using the at least one processor to determine a data access time of each of at least some of the to-be-categorized storage units by reading the categorizing data therein and to record the data access times of said at least some of the to-be-categorized storage units; and
 c) using the at least one processor to categorize the to-be-categorized storage units into a plurality of groups that respectively correspond to a plurality of data access speed categories with reference to the data access times recorded in step b), the groups including a group corresponding to fast data access speed, and a group corresponding to slow data access speed;
 wherein, the storage medium includes (M) number of the to-be-categorized storage units; and
 wherein step c) includes the sub-steps of:
  c-1) using the at least one processor to arrange the to-be-categorized storage units in a sequence according to the data access times thereof; and
  c-2) using the at least one processor to categorize first (m) number of the to-be-categorized storage units in the sequence into the group corresponding to fast data access speed, and the rest of the to-be-categorized storage units into the group corresponding to slow data access speed, (m) being a positive integer smaller than (M).

11. A machine-implemented method for storing a target code in a storage medium that includes a plurality of storage units, the machine-implemented method comprising the steps of:
 a) using at least one processor to categorize the storage units of the storage medium into a plurality of groups;
 b) using the at least one processor to make each of the storage units in a first one of the groups available for data writing, and to make each of the storage units in the other ones of the groups unavailable for data writing;
 c) using the at least one processor to write at least a portion of the target code into the storage units in the first one of the groups;
 d) using the at least one processor to obtain an image file of the storage medium; and
 e) using the at least one processor to use the image file for preloading, into another storage medium that has the same specification as the storage medium, information regarding the categorization of the storage units and the writing of said at least a portion of the target code.

12. The machine-implemented method as claimed in claim 11, the target code being for an operating system, wherein, in step a), the storage units having faster data access speeds are categorized into the first one of the groups.

13. The machine-implemented method as claimed in Claim 11, the target code being for a recovery software, wherein, in step a), the storage units having slower data access speeds are categorized into the first one of the groups.

14. A machine-implemented method for storing a target code in a storage medium that includes a plurality of storage units, the storage units being categorized into a plurality of groups that respectively correspond to a plurality of data access speed categories with reference to data access speeds of the storage units, the machine-implemented method comprising the steps of:
 a) upon receipt of a request to store a target code with a predetermined usage rate, using at least one processor to select, from among the groups, a selected one of the groups, the data access speed category corresponding to which corresponds to the usage rate of the target code; and
 b) using the at least one processor to store the target code into at least one of the storage units in the selected one of the groups;
 wherein the machine-implemented method further comprises the steps of, prior to step a):
 c) using the at least one processor to write categorizing data for filling each of the storage units of the storage medium;
 d) using the at least one processor to determine a data access time of each of at least some of the storage units by reading the categorizing data therein and to record the data access times of said at least some of the storage units; and
 e) using the at least one processor to categorize the storage units into the plurality of groups with reference to the data access times recorded in step d);
 wherein the machine-implemented method further comprises the step of, between step a) and step b): f) using the at least one processor to clear each of the storage units in the selected one of the groups.

15. The machine-implemented method as claimed in claim 14, further comprising the step of: c) using the at least one processor to set said at least one of the storage units in the selected one of the groups as a hidden zone after step b).

16. The machine-implemented method as claimed in claim 15, wherein the target code is for a recovery software, and the selected one of the groups corresponds to one of a slower data access speed category and a slowest data access speed category among the plurality of groups.

17. The machine-implemented method as claimed in claim 14, further comprising the steps, after step c), of:
 g) using the at least one processor to obtain an image file of the storage medium; and
 h) using the at least one processor to use the image file for preloading, into another storage medium that has the same specification as the storage medium, information regarding the categorization of the storage units and the writing of the target code.

18. A machine-implemented method for storing a target code in a storage medium that includes a plurality of storage units, the storage units being categorized into a plurality of groups that respectively correspond to a plurality of data access speed categories with reference to data access speeds of the storage units, the machine-implemented method comprising the steps of:
- a) upon receipt of a request to store a target code with a predetermined usage rate, using at least one processor to select, from among the groups, a selected one of the groups, the data access speed category corresponding to which corresponds to the usage rate of the target code;
- b) using the at least one processor to store the target code into at least one of the storage units in the selected one of the groups; and
- c) using the at least one processor to set said at least one of the storage units in the selected one of the groups as a hidden zone after step b);

wherein the target code is for a recovery software, and the selected one of the groups corresponds to one of a slower data access speed category and a slowest data access speed category among the plurality of groups.

19. A machine-implemented method for storing a target code in a storage medium that includes a plurality of storage units, the storage units being categorized into a plurality of groups that respectively correspond to a plurality of data access speed categories with reference to data access speeds of the storage units, the machine-implemented method comprising the steps of:
- a) upon receipt of a request to store a target code with a predetermined usage rate, using at least one processor to select, from among the groups, a selected one of the groups, the data access speed category corresponding to which corresponds to the usage rate of the target code;
- b) using the at least one processor to store the target code into at least one of the storage units in the selected one of the groups;
- c) using a processor to obtain an image file of the storage medium; and
- d) using the at least one processor to use the image file for preloading, into another storage medium that has the same specification as the storage medium, information regarding the categorization of the storage units and the writing of the target code.

20. A machine-implemented method for storing a target code in a storage medium that includes a plurality of storage units, the machine-implemented method comprising the steps of:
- a) upon receipt of a request to store a target code with a predetermined usage rate and a predefined capacity, using at least one processor to find a group of the storage units of the storage medium corresponding to a data access speed category that corresponds to the usage rate of the target code with reference to a data access speed of each of the storage units of the storage medium and the predefined capacity; and
- b) using the at least one processor to store the target code into at least one of the storage units in the group;
- c) using the at least one processor to obtain an image file of the storage medium; and
- d) using the at least one processor to use the image file for preloading, into another storage medium that has the same specification as the storage medium, information regarding the writing of the target code.

* * * * *